(12) United States Patent
Shinozaki

(10) Patent No.: US 8,055,214 B2
(45) Date of Patent: Nov. 8, 2011

(54) MOBILE COMMUNICATION SYSTEM

(75) Inventor: Atsushi Shinozaki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1021 days.

(21) Appl. No.: 11/898,984

(22) Filed: Sep. 18, 2007

(65) Prior Publication Data

US 2008/0070518 A1    Mar. 20, 2008

Related U.S. Application Data

(63) Continuation of application No. PCT/JP2005/005212, filed on Mar. 23, 2005.

(51) Int. Cl.
*H04B 1/02* (2006.01)

(52) U.S. Cl. .......... 455/101; 455/91; 455/130; 455/208; 714/790; 714/794; 375/341

(58) Field of Classification Search .................. 455/101, 455/91, 130, 208; 714/790, 794; 375/341
See application file for complete search history.

(56) References Cited

U.S. PATENT DOCUMENTS

| | | | |
|---|---|---|---|
| 5,978,365 A | 11/1999 | Yi | |
| 6,247,158 B1 * | 6/2001 | Smallcomb | 714/786 |
| 6,456,847 B1 | 9/2002 | Lilja et al. | |
| 7,281,197 B2 * | 10/2007 | Li | 714/790 |
| 7,287,211 B2 * | 10/2007 | Taguchi et al. | 714/794 |
| 7,570,700 B2 * | 8/2009 | Cameron et al. | 375/265 |
| 2003/0063583 A1 | 4/2003 | Padovani et al. | |
| 2004/0179506 A1 | 9/2004 | Padovani et al. | |
| 2004/0180695 A1 | 9/2004 | Sano | |

FOREIGN PATENT DOCUMENTS

| | | |
|---|---|---|
| JP | 2000-184428 | 6/2000 |
| JP | 2001-522211 | 11/2001 |
| JP | 2002-503918 | 2/2002 |
| JP | 2003-503863 | 1/2003 |
| JP | 2003101473 | 4/2003 |
| JP | 2005033399 | 2/2005 |
| KR | 20010083095 | 8/2001 |
| WO | WO 99-23844 | 5/1999 |

(Continued)

OTHER PUBLICATIONS

Notice of Rejection Ground issued in corresponding Japanese Patent Application No. 2007-509115 dated Jan. 26, 2010.

(Continued)

*Primary Examiner* — Sanh Phu
(74) *Attorney, Agent, or Firm* — Murphy & King P.C.

(57) ABSTRACT

At a transmitting end, information data, which is data to be transmitted, is copied via a number of wireless transmission paths and then encoded. Each piece of data is then subjected to a respective different pattern of puncturing process and transmitted to a receiving end via a respective wireless transmission path. At the receiving end, dummy data is embedded into the punctured data and decoded. The puncture patterns at the transmitting end for the respective different wireless transmission paths are prepared such that they are different from each other. In particular, the bits to be removed are preferably different from each other between the different puncture patters. At the receiving end, if the decoding of the data for any wireless transmission path has failed, the data obtained from other wireless transmission paths are combined and decoded. In this way, the probability of a decoding failure occurring can be lowered.

2 Claims, 17 Drawing Sheets

FOREIGN PATENT DOCUMENTS

| | | |
|---|---|---|
| WO | WO 99-41872 | 8/1999 |
| WO | WO 00-02404 | 1/2000 |
| WO | WO 00-36867 | 6/2000 |

OTHER PUBLICATIONS

Office Action Issued in corresponding KR Patent Application 10-2007-7020884 dated Apr. 2, 2009.

First Office Action issued on Sep. 20, 2010 in corresponding Chinese Application No. 200580049173.1.

Chinese 2nd Notification of Office Action dated Jun. 9, 2011 for application No. 200580049173.1.

Japanese Notice of Rejection Grounds dated Jun. 14, 2011 for application No. 2011-066493.

\* cited by examiner

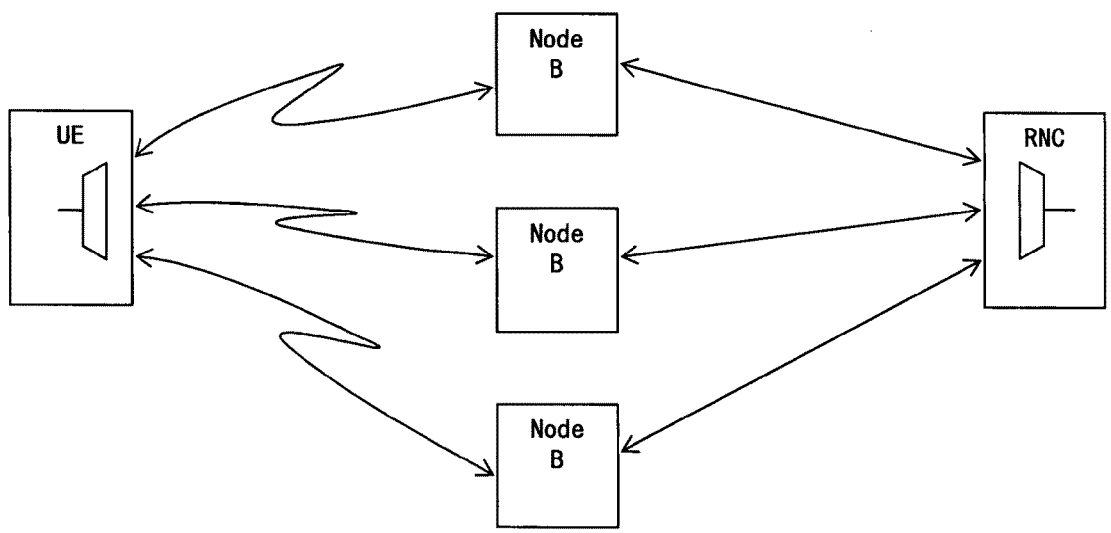
F I G. 1

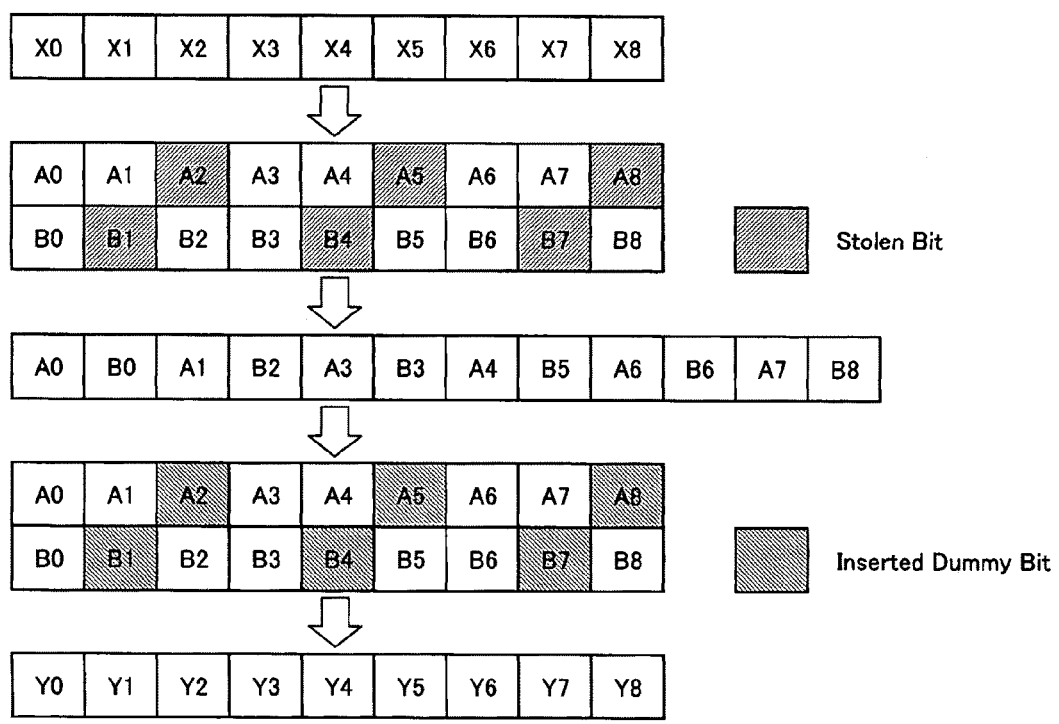
F I G. 2

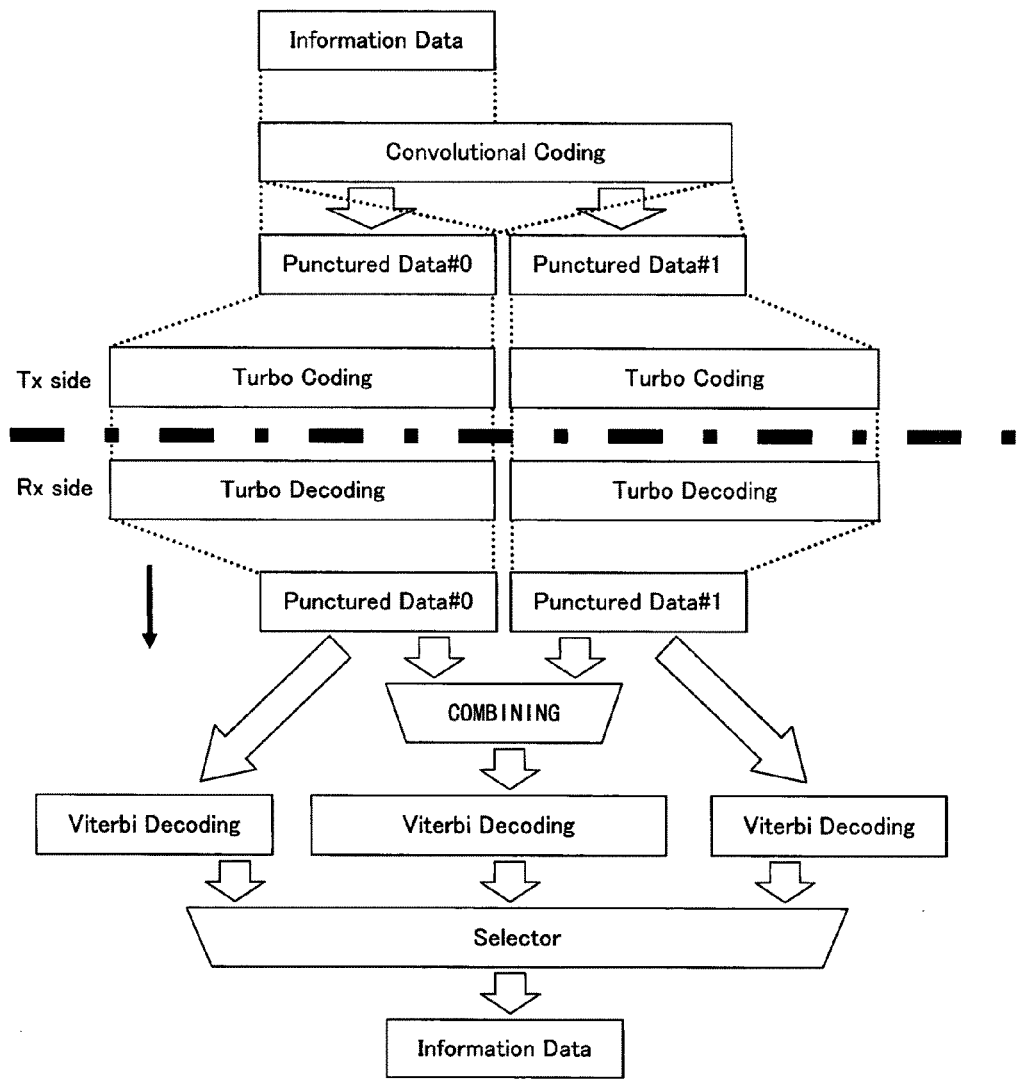
F I G. 6

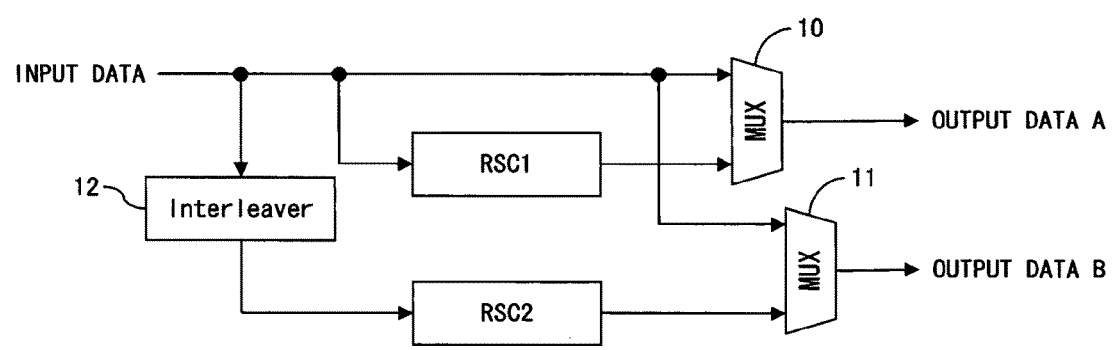
F I G. 9

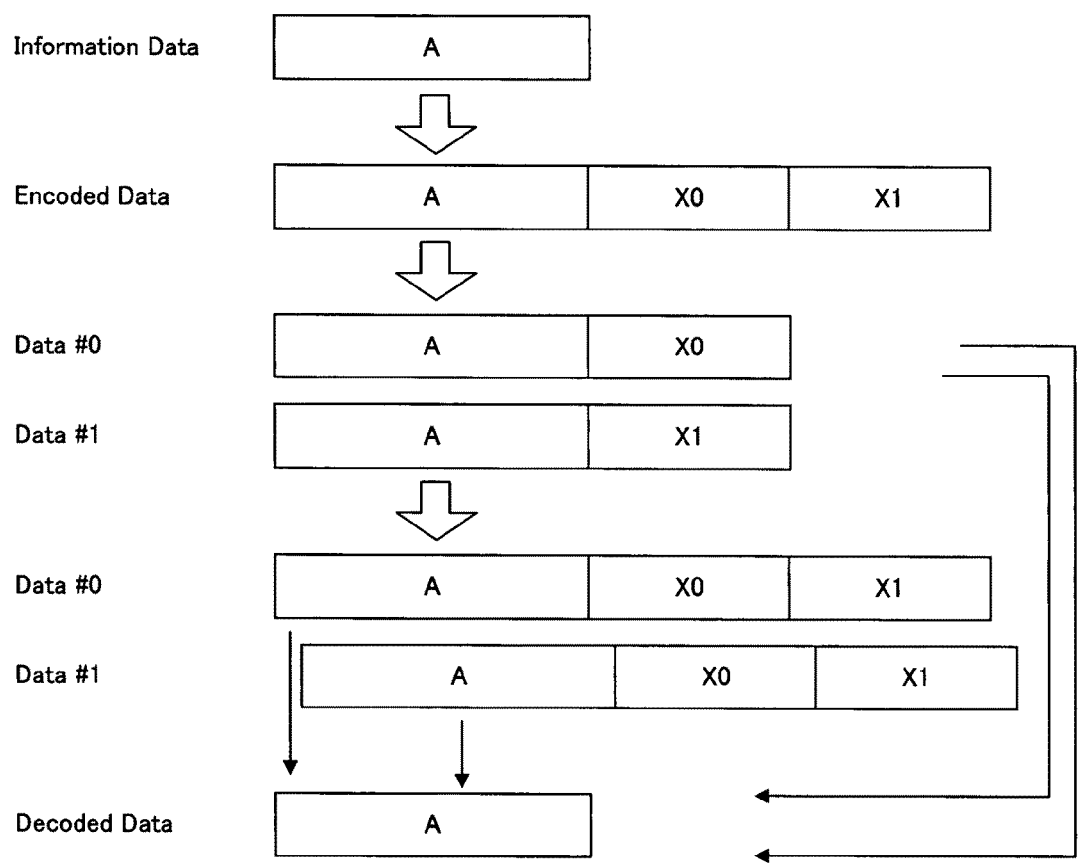
F I G. 1 0

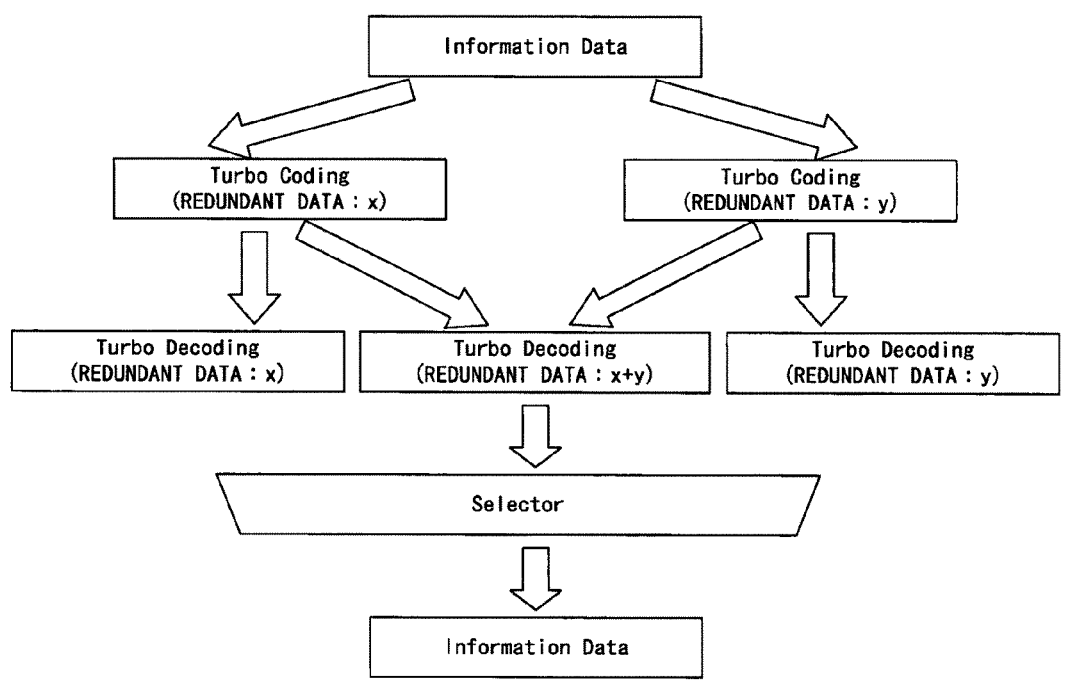
F I G. 1 1

|  | ORIGINAL DATA | REDUNCANT DATA 1 | REDUNDANT DATA 2 | TRANSMISSION CHANNEL 1 | TRANSMISSION CHANNEL 2 |
|---|---|---|---|---|---|
| ORIIGINAL DATA | 90 | | | | |
| ENCODING | 90 | 90 | 90 | | |
| INTERLEAVE | 90 | 90 | 90 | | |
| SEGMENT | 45 | 90 | 90 | | |
| PUNCTURE | 30 | 60 | 60 | 90 | 90 |

FIG. 14

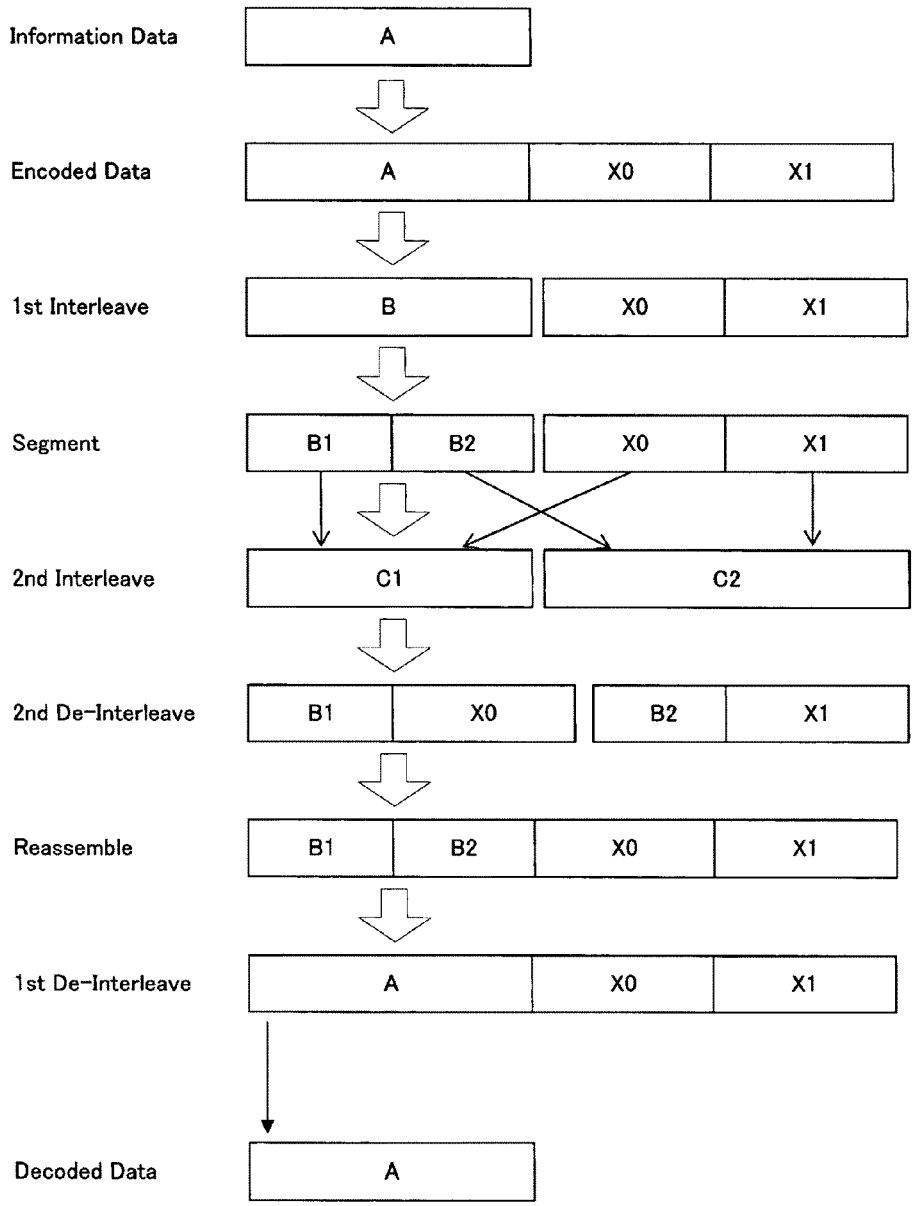
F I G. 1 5

MOBILE COMMUNICATION SYSTEM

CROSS-REFERENCE TO RELATED APPLICATIONS

This application is a continuation application of an international application No. PCT/JP2005/005212, which was filed on Mar. 23, 2005.

BACKGROUND OF THE INVENTION

1. Field of the Invention

The present invention relates to a mobile communication system, and it is suitable for use in transmitting data from different sectors or wireless zones to one mobile station.

2. Description of the Related Arts

Diversity transmission in a 3GPP system (e.g. diversity transmission between sectors or between wireless zones) is realized by selection/combination and duplication/distribution between UE and RNC. In other words, identical data is transmitted and received in two or more radio transmission channels, and the transmission channels with better quality (the ones that transmit data containing fewer errors) are selected.

FIG. 1 is an explanatory diagram of a diversity transmission (DHO: Diversity Hand-Over) between base stations.

To explain the downlink, a base station controller RNC duplicates data when transmitting the data to a mobile terminal that is in a soft hand-over state and transmits the data to each base station (Node-B). Each of the base stations performs error correction encoding processing such as convolutional encoding (turbo encoding) of the received data, reduces data volume by performing puncture processing, and transmits the same transmission data to a mobile terminal UE. The mobile terminal UE combines the data received via each base station (in the example of FIG. 1, three radio transmission channels) and decodes the data.

FIG. 2 is a diagram showing a state of data volume suppression that has been caused by a puncture.

Using convolutional encoding with an encoding rate of ½, the data volume increases twice as much; however, the data volume can be suppressed by the puncturing.

Data consisting of the 9 bits X0-X8 at first becomes, for example, data consisting of the 18 bits A0-A8 and B0-B8 via convolutional encoding. Via the puncturing of the data, bits of A2, A5, A8, B1, B4, and B7 are removed as shown in FIG. 2. The data to be transmitted is consequently data consisting of 12 bits. Therefore, data consisting of 18 bits becomes data consisting of 12 bits via the puncturing, and the data volume can be reduced to ¾. The mobile terminal at the receiving end receiving the data consisting of 12 bits inserts a dummy bit into a portion of the bits removed by the puncturing, performs error correction decoding (e.g. viterbi decoding, turbo decoding) afterwards, and decodes data consisting of Y0-Y8. It is obvious that the bits Y0-Y8, if there is no bit error, have to be the same bits as X0-X8.

However, although transmission of identical data via different radio transmission channels is significant in terms of obtaining diversity gain, it is not necessarily preferable when performing intense error correction encoding/decoding processing. In fact, in the H-ARQ method, different data with different rate matching patterns is transmitted rather than transmitting the same data at the time of data retransmission. Patent Document 1 discloses a system applying different encoding methods in accordance with transmission quality.

Patent Document 1: Kohyo (National Publication of Translated Version) No. 2002-503918

SUMMARY OF THE INVENTION

It is an object of the present invention to provide an efficient communication system in consideration of error correction encoding/decoding processing.

The first mobile communication system of the present invention is a mobile communication system having a function of transmitting a radio signal via a different radio transmission path to a mobile station, comprising an error correction encoding unit for performing error correction encoding processing of transmission data, a transmission unit for puncturing the data processed by the error correction encoding processing with a first puncture pattern and for transmitting data via a first radio transmission path to the mobile station, and a transmission unit for puncturing the data processed by the error correction encoding processing with a second puncture pattern and for transmitting data via a second radio transmission path to the mobile station.

The second mobile communication system of the present invention is a mobile communication system having a function of transmitting a radio signal via a different radio transmission path to a mobile station, comprising a systematic encoding unit for obtaining systematic data, first redundant data and second redundant data by performing error systematic encoding processing of transmission data; a transmission unit for transmitting a radio signal via a first radio transmission path to the mobile station on the basis of the systematic data and the first redundant data; and a transmission unit for transmitting a radio signal via a first radio transmission path to the mobile station on the basis of the systematic data and the second redundant data.

The third mobile communication system of the present invention is a mobile communication system having a function of transmitting a radio signal via a different radio transmission path to a mobile station, comprising a systematic encoding unit for obtaining systematic data, a first piece of redundant data and a second piece of redundant data by performing error systematic encoding processing of transmission data; a transmission unit for transmitting a radio signal via a first radio transmission path to the mobile station on the basis of a portion of the systematic data and the first redundant data; and a transmission unit for transmitting a radio signal via a first radio transmission path to the mobile station on the basis of another portion of the systematic data and the second redundant data.

The first mobile station of the present invention is a mobile station having a function of receiving a radio signal via a different radio transmission path, comprising a reception unit for receiving a first radio signal that is composed of error correction encoding data punctured by a first puncture pattern and transmitted via a first radio transmission path, and a second radio signal that is composed of error correction encoding data punctured by a second puncture pattern and transmitted via a second radio transmission path zone; and a decoding unit for performing error correction decoding processing on the basis of data obtained by synthesizing the first radio signal and the second radio signal.

The second mobile station of the present invention is a mobile station having a function of receiving a radio signal via a different radio transmission path, comprising a reception unit for receiving a first radio signal transmitted via a first radio transmission path on the basis of first redundant data obtained by systematic encoding and systematic encoded data, and a second radio signal transmitted via a second radio transmission path on the basis of second redundant data obtained by the systematic encoding and the systematic encoded data; and a decoding unit for performing error correction decoding processing on the basis of data obtained by synthesizing the first radio signal and the second radio signal.

BRIEF DESCRIPTION OF THE DRAWINGS

FIG. 1 is an image diagram of DHO between base stations;

FIG. 2 is a diagram showing a state of data volume suppression by puncture;

FIG. 6 is a diagram showing an example of a data flow of the first embodiment of the present invention;

FIG. 9 is a diagram (1) explaining the second embodiment;

FIG. 10 is a diagram (2) explaining the second embodiment;

FIG. 11 is a diagram explaining a data flow of the second embodiment;

FIG. 14 is a diagram explaining an effect of the puncture processing;

FIG. 15 is a diagram explaining a data processing flow of the third embodiment;

DESCRIPTION OF THE PREFERRED EMBODIMENTS

The first embodiment is set forth in the following description.

Figure 3:
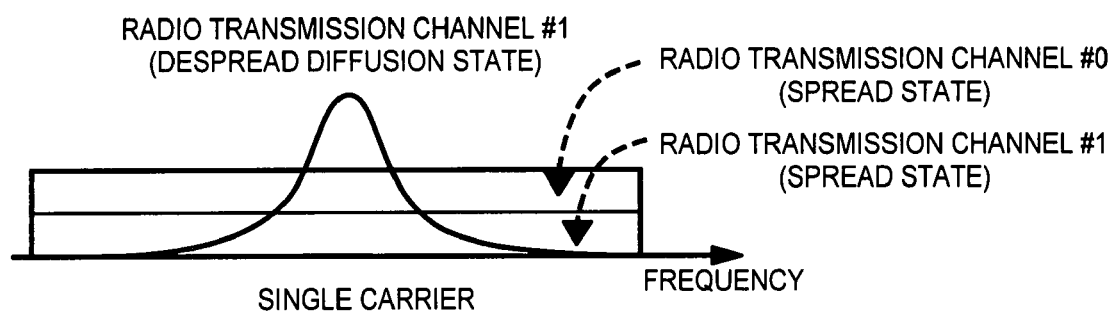
FIG. 3 is a diagram explaining problems in some of the prior arts.
Figure 4:
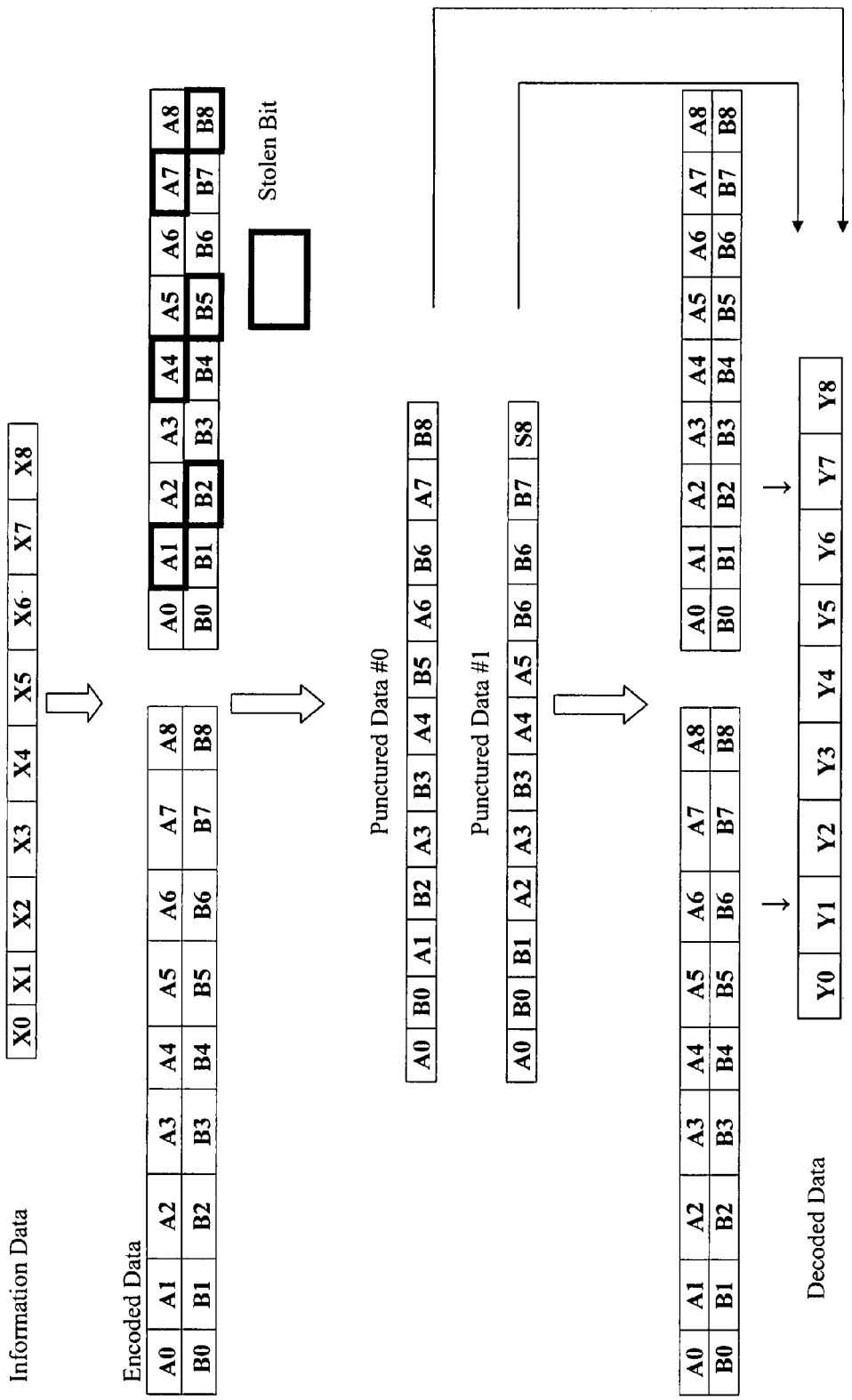
FIG. 4 is a diagram explaining the first embodiment of the present invention.

FIG. 4 is a diagram explaining the first embodiment of the present invention.

At the transmission end, a plurality of types of encoded data are obtained by performing puncture processing employing different puncture patterns after error correction coding such as convolutional encoding or turbo encoding of transmitted data, and each of the pieces of data is transmitted wirelessly via different radio transmission channels.

Here, different puncture patterns are employed because a portion of the data that is not included in the data received via a radio transmission channel can be obtained via another radio transmission channel.

Note that these two radio transmission channels can be a radio transmission channel via a first sector and a radio transmission channel via a second sector that are both configured by a single radio base station, or a radio transmission channel via a first zone and a radio transmission channel via a second zone that are each configured by different radio base stations.

At the receiving end, even though data decoding can be realized by decoding data received via any single radio transmission channel of the plurality of radio transmission channels, the decoding can be also performed after combining the codes of data received from each of the plurality of radio transmission channels.

In a case, for example, in which decoding of each piece of data received via each of the radio transmission channels is performed independently and all of them have failed (e.g. an error is detected in decoded data by error-detecting coding such as CRC coding before the error correction coding), the data received via a plurality of radio transmission channels is combined and decoding of the obtained data is performed.

In the process of combination, processing is performed so that the processing of the data received via a first radio transmission channel, which is a portion of the data deleted by being punctured with a first puncture pattern, is complemented by a portion of the data of the data received via a second radio transmission channel that remained after being punctured with a second puncture pattern.

For example, the A2 piece of puncture data #0 punctured with the first puncture pattern is complemented by inserting the A2 piece of puncture data #1 punctured with the second puncture pattern.

Note that a common data piece such as A0 can be combined by, for example, obtaining an average of likelihood information (information indicating the likelihood of data being 1 or 0).

In other words, information data of X0-X8 is coded at a coding rate of ½, and encoded data of A0-A8 and B0-B8 are obtained. Two types of data (puncture data #0 and puncture data #1), each of which has different puncture processing performed with the first or the second puncture pattern, are obtained for the encoded data. In this case, the puncture data #0 (see the encoded data on the left in FIG. 4) has puncture processing to remove bits indicated in A2, A5, A8, B1, B4, and B7, and the puncture data #1 (see the encoded data on the right in FIG. 4) has puncture processing to remove bits indicated in A1, A4, A7, B2, B5, and B8. The puncture data #0 is transmitted from the first radio transmission channel and the puncture data #1 is transmitted from the second radio transmission channel. Note that the first radio transmission channel and the second radio transmission channel are transmission channels that can be separated by at least any one of a spreading code, a frequency, and time.

Here, puncture patterns performed in each of the radio transmission channels are negotiated in advance between mobile terminals and base stations for each radio transmission channel. Each piece of data transmitted in the first radio transmission channel (#0) and transmitted in the second radio transmission channel (#1) is independently decoded and they become decoded data Y0-Y8.

As explained above, if no error is detected in the decoded result among any of the data received via the radio transmission channels, the data is output as a decoded result, and no particular combining of the data received via both of the radio transmission channels is required.

However, if an error is detected in the decoded result among all the data received via the radio transmission channels, the data received via the radio transmission channel #0 is combined with the data received via the radio transmission channel #1 (the average of likelihoods can be taken as well; in this case however only complementation is performed) and afterward decoding is performed once again. Alternatively, the data received via the radio transmission channel #1 is combined with the data received via the radio transmission channel #0 (the average of likelihoods can be taken as well; in this case however only complementation is performed) and afterward decoding is performed once again. For details of the complementation, see the block on the left side (complementation of data in the radio transmission channel #0) and the block on the right side (complementation of data in the radio transmission channel #1) in the second step from the bottom in FIG. 4.

The error-detecting coding, the error correction coding and the implementation of different punctures can be performed in a DHO processing unit in RNC (a base station controller) that is connected to a plurality of base stations and functions as an upper-level apparatus of the base station, or can be performed in base stations. It is obvious that in addition to the coding, in order to be further tolerant against transmission channel errors, additional error correction coding processing may be performed in base stations etc.

Figure 5A:
FIGS. 5A through 5C are diagrams explaining a notification method of puncture patterns.
Figure 5B:
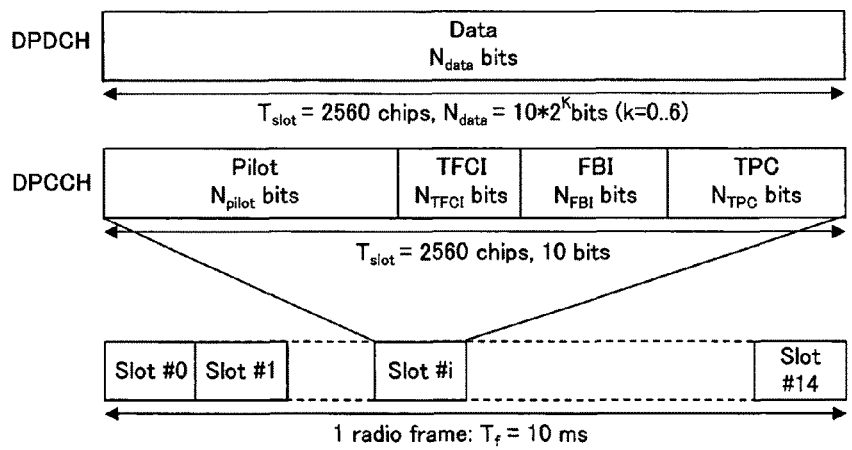
Figure 5C:
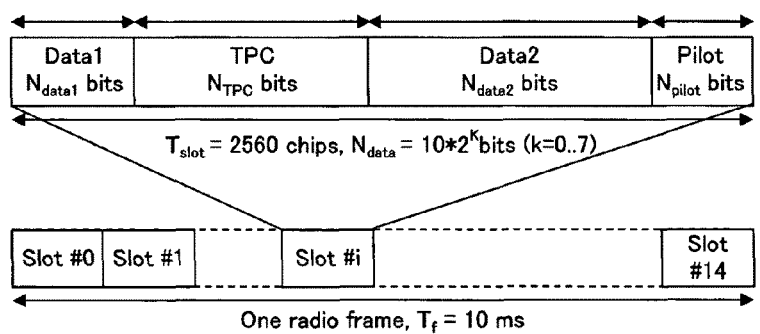

FIGS. 5A through 5C are diagrams explaining a notification method of puncture patterns available as a mode of the puncture pattern negotiation.

For the puncture patterns in each of the radio transmission channels, a negotiation is required in advance at data transmitting/receiving ends. It is possible to notify in-channel the receiving end of a puncture pattern generated at a transmitting end. In the case of in-channel notification, information added to the encoded data is defined and a puncture pattern is reported according to the information.

The method for in-channel notification can be a method for adding the information to information data as in FIG. 5A or a method for reporting the information as control information in another channel (FIGS. 5B and C). FIG. 5A shows a method in which puncture pattern information is added as a header of a frame for transmitting encoded data, and the receiving end performs complementation processing using data received via another radio transmission channel on the basis of the puncture pattern information. FIG. 5B is an example of a case in which a control channel is a different channel from a data channel. In particular, in FIG. 5B, DPDCH is a data channel and is also a channel in which encoded data is transmitted, and each of those can be transmitted in, for example, the I-channel and Q-channel respectively. At that time, additionally, different spreading codes can be used for spread processing before transmission. DPCCH is a control channel in which bits such as PILOT, TFCI, FBI, and TPC are transmitted and the puncture pattern information is inserted in empty bits. FIG. 5C shows a case in which the multiplexing mode is a time-division multiplex, and DPDCH and DPCCH are time-multiplexed and inserted within a single slot. In this case also, puncture pattern information is stored in empty areas of the control channel storing TPC and PILOT bits.

Note that it is preferable to transmit both the puncture pattern information of the first puncture pattern and the puncture pattern information of the second puncture pattern of data to be transmitted via the first radio transmission channel and the second radio transmission channel from a sector (zone) forming the first radio transmission channel.

By defining identification data (ID) for each of the puncture patterns, and by multiplexing and transmitting the ID information in the order corresponding to the first radio transmission channel and the second radio transmission channel, the receiving end can obtain the information of both the first puncture pattern and the second puncture pattern from a sector (zone) forming the first radio transmission channel in a lower volume of data.

FIG. 6 is a diagram showing an example of a data flow of the first embodiment of the present invention.

First, convolution coding of information data is performed (preferably, the information data has been processed with error-detecting coding) and copied into two pieces. Each of the two pieces of the data is punctured with a distinct puncture pattern, encoded by turbo encoding, and transmitted to a radio transmission channel. When these two pieces of data are received in the receiving end, turbo decoding is performed and a decoded result is obtained.

For each of the decoded results corresponding to each radio transmission channel, de-puncture processing, which is the reverse processing of each different puncturing process, is performed, and decoding is performed by Viterbi decoding or other such means. Note that in performing the decoding, it is assumed that complementation by data received from another radio transmission channel is not performed.

In addition, each of the turbo-decoded data is combined and the viterbi decoding is performed.

Eventually, of the decoded results, decoded data from which no errors are detected is selected and information data is obtained at the receiving end.

Figure 7:
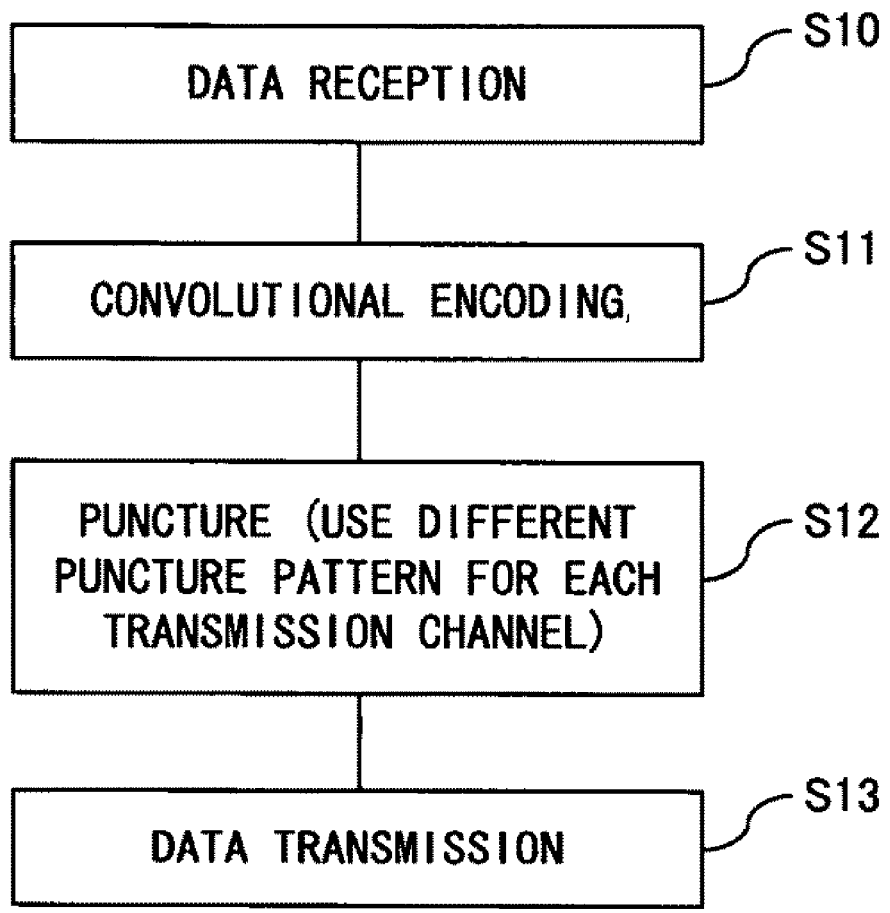
FIG. 7 is a flowchart (1) of a DHO unit at the transmitting end and the receiving end of the first embodiment.
Figure 8:
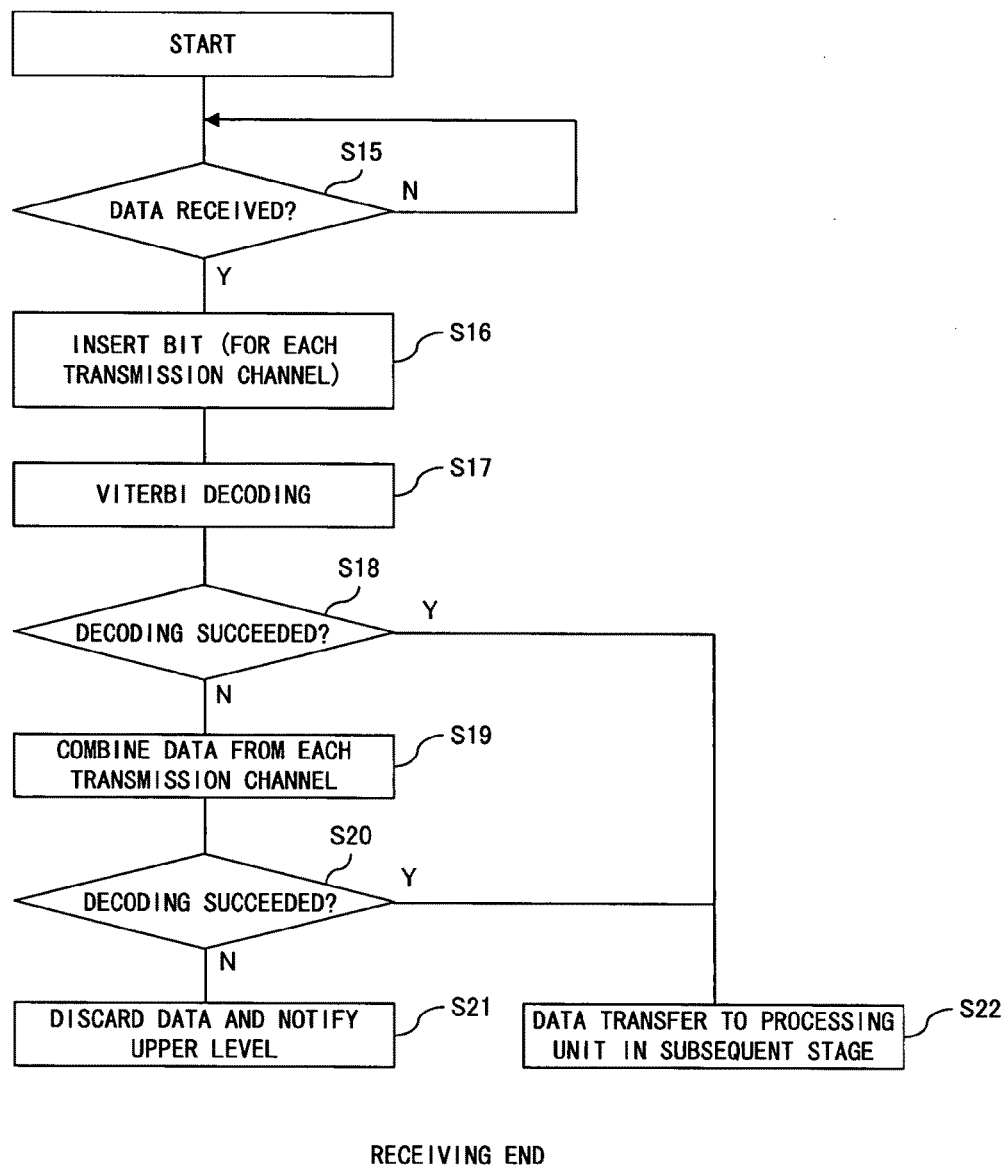
FIG. 8 is a flowchart (2) of a DHO unit at the transmitting end and the receiving end of the first embodiment.

FIG. 7 and FIG. 8 are flowcharts of the transmitting end and the receiving end of the first embodiment.

In the processing at the transmitting end in FIG. 7, in step S10, information data (error-detecting coded information data) is received by the DHO unit (a unit for diversity handover, in this case comprised in the RNC), and in step S11, convolution coding is performed. In step S12, puncture processing is performed. At that time, a distinct puncture pattern is used for each of the transmission channels. In step S13, punctured data is transmitted.

In the processing at the receiving end in FIG. 8, step S15 is a step for waiting for data reception. When the data is received, in step S16, a dummy bit for each transmission channel is inserted into a punctured bit (i.e. at this point, the data received via other transmission channels is not inserted.) In step S17, Viterbi decoding is performed, and in step S18, whether or not the decoding succeeded is determined. If the determination in step S18 is Yes, in step S22, the data is transferred to a processing unit in a subsequent stage. If the determination in step S18 is No, in step S19, the data from each of the radio transmission channels is combined (i.e., data received via another radio transmission channel is used) and the data is decoded. In step S20, whether or not the decoding succeeded is determined. In step S20, when it is determined that the decoding has succeeded, the data is transferred to a processing unit in the subsequent stage in step S22. In step S20, when it is determined that the decoding has failed, the data is discarded, and upper-level layers are notified that the data has been discarded.

In the following description, the second embodiment of the present invention is set forth.

In the second embodiment, the transmitting end, after performing systematic coding (e.g., turbo encoding) processing of the data, adds different redundant data to the data and transmits it to each of the radio transmission channels.

In the first radio transmission channel, a systematic code and first redundant data (e.g., redundant data obtained from a systematic code coded by convolution coding in which the data do not include second redundant data) are transmitted, and in the second radio transmission channel, a systematic code and second redundant data (e.g. redundant data obtained from a systematic code coded by convolution coding after interleave processing in which the data do not include the first redundant data) are transmitted.

At the receiving end, decoding of the data in a single transmission channel can be performed; however, in a case in which data decoding of separate radio transmission channels has failed, the data decoding is performed by combining (assembling) different redundant data received from each of the radio transmission channels.

Combining refers to the meaning as described above, and is for example data complementation or the averaging of likelihoods.

To the data with different redundant codes added to it, data volume reduction processing such as puncturing can be implemented. To the original data, the first embodiment can be applied. For example, it is possible for the data to be interleaved and different punctures to be implemented for each of the transmission channels.

FIG. 9 and FIG. 10 are diagrams explaining the second embodiment.

FIG. 9 is an example of a configuration of a turbo encoder used in the second embodiment. Input data is input into a multiplexer 10. The input data is also input into and encoded in an RSC (Recursive Systematic Convolutional) encoder RSC 1, and is input into the multiplexer 10. In the multiplexer 10, the input data and RSC-encoded data are multiplexed and become output data A. The input data is also input into a multiplexer 11. The input data, additionally, after being interleaved by an interleaver 12, is encoded by an RSC encoder RSC2, and input into the multiplexer 11. In the multiplexer 11, the input data and interleaved and RSC-encoded data are multiplexed and become output data B. The output data A and the output data B are each different redundant data.

FIG. 10 is a diagram explaining the operation of the second embodiment. Data A, which is information data (preferably error detecting encoded data), is encoded by the encoder in FIG. 9, and is made into data #0 and data #1 by adding different redundant data X0 and X1 to data A. Data #0 and data #1 are independently decoded at the receiving end by using the redundant data X0 and X1 respectively. When the decoding fails, data #0 is further added to the redundant data X1 of data #1, and data #1 is further added to the redundant data X of data #0, and data A is decoded by using the redundant data X0 and X1. As a result, it is possible to reduce the possibility of decoding failure.

Note that decoding can be performed by using (complementing and combining) both data #0 and data #1 from the beginning.

Encoding can be performed in the DHO processing unit in RNC (a base station controller), or can be performed in the base station. It is obvious that in addition to the encoding, in order to be further error-tolerant against transmission channel errors, additional error correction coding processing can be performed.

FIG. 11 is a diagram explaining the data flow of the second embodiment.

Information data that is transmission data is copied and distributed for each of the radio transmission channels. In this case, it is assumed that two radio transmission channels are present. The information data for each radio transmission channel is encoded by the encoder in FIG. 9, and different redundant data x and y are added. The encoded data is transmitted to and received by the receiving end via the radio transmission channel. At the receiving end, using both of the redundant data x and y and also using x+y, the information data is decoded. Afterward, the data with the lowest error rate is selected by a selector and the original information data is obtained.

Figure 12:
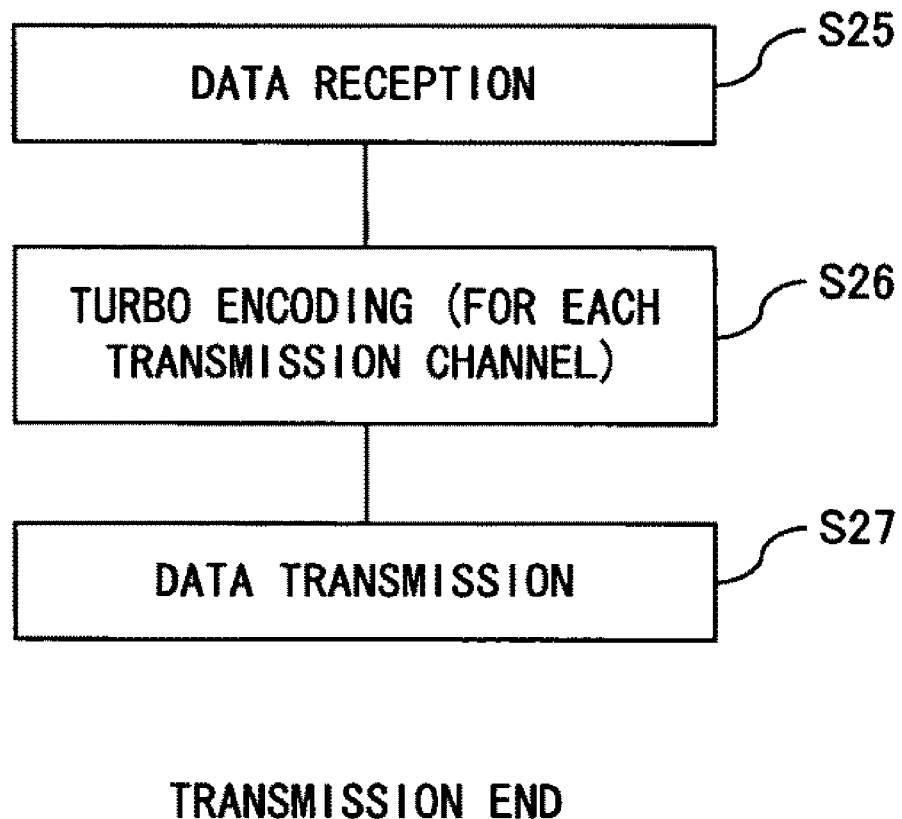
FIG. 12 is a flowchart (1) showing processing of the DHO unit at the transmitting end and the receiving end of the second embodiment.
Figure 13:
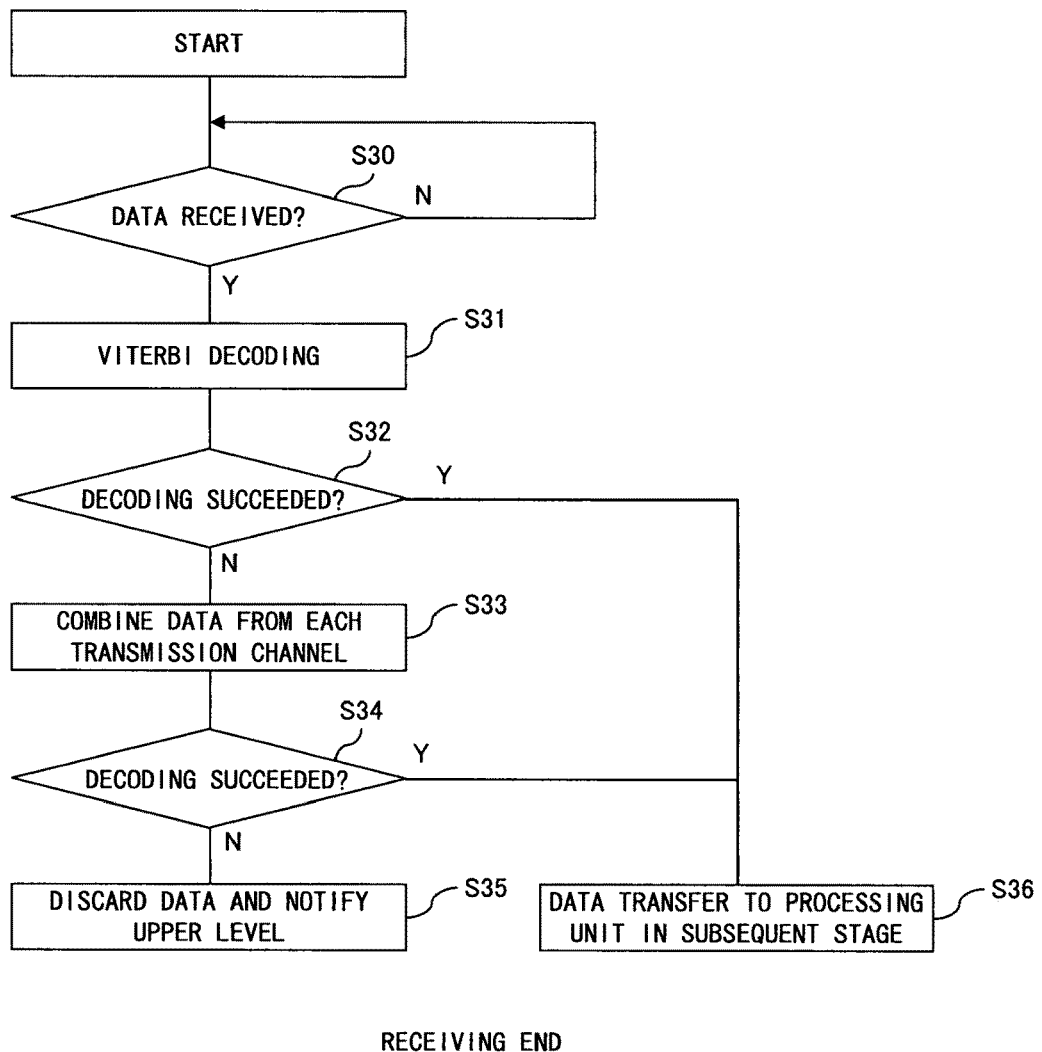
FIG. 13 is a flowchart (2) showing processing of the DHO unit at the transmitting end and the receiving end of the second embodiment.

FIG. 12 and FIG. 13 are flowcharts showing processing of the DHO unit at the transmitting end and the receiving end of the second embodiment.

FIG. 12 shows a flow at the transmitting end. When the DHO unit receives data to be transmitted in step S25, the data is turbo-encoded for each transmission channel by using the encoder in FIG. 9 and the redundant data that are different for each transmission channel in step S26. In step S27, the encoded data is transmitted.

FIG. 13 shows a flow at the receiving end. Step S30 is a step for waiting for data reception. In step S31, the received data is decoded by viterbi decoding. In step S32, whether or not the decoding has succeeded is determined. In step S32, when it is determined that the decoding has succeeded, the process proceeds to step S36 and the data is transferred to a processing unit in the subsequent stage. When it is determined that the decoding has failed in step S32, data from each of the transmission channels are combined, the redundant data used in each transmission channel is also combined, and the data is decoded using the combined data in step S33. In step S34, whether or not the decoding has succeeded is determined. As a result of the determination in step S34, when it is determined that the decoding has succeeded in step S36, the data is transferred to the processing unit in the subsequent stage. When it is determined that the decoding has failed in step S34, the data is discarded, and upper-level layers are notified that the data has been discarded in step S35.

In the following description, the third embodiment is set forth.

The transmitting end, after turbo encoding processing, adds different redundant data to the data and transmits it to each of the radio transmission channels. Here, unlike the second embodiment, 1st interleave processing of a systematic data portion (original data A before turbo encoding) is processed before data transmission. Furthermore, the data processed by 1st interleave processing is divided for each radio transmission channel and redundant data that is generated when the encoding processing is performed as described above is added to each piece of the data. Note that the redundant data to be added are different in each transmission channel. Additionally, all of the data added with a redundant code is processed by 2nd interleave processing.

It should be noted that at the time of dividing, it is possible to divide the data without overlapping of the data occurring in each radio transmission channel, or it is also possible to divide the data allowing it to overlap but avoiding the production of identical data.

At the receiving end, the data received from each radio transmission channel is processed by 2nd de-interleave processing. Afterwards, assembly processing of the divided original data is performed. 1st de-interleave processing is performed on the assembled data, and the original data is obtained. Data decoding of the data is performed by combining one or more of the correction codes transmitted from each transmission channel.

It should be noted that in the assembly of the original data, if the data does not contain overlapping, the data can be easily assembled, and if the data has any overlapping, the assembly can be performed with the removal of the overlapping (or by averaging the overlapping and assembling the rest of the parts).

To the data added to different redundant codes, data volume reduction processing such as puncturing can be implemented. Note that in a case in which the present embodiment is implemented in the base station controller and data is distributed to each base station, the puncture processing is effective for data volume compression between the base station controller and the base station.

FIG. 14 is a diagram explaining an effect of the puncture processing.

In this example, at the time of the encoding turbo encoding is performed; the data volume is increased by three times; the data volume is then decreased to ⅔ by the puncturing; and there are two transmission channels. Assume that the original data length is 90, and redundant data 1 and 2 with each length being 90 are generated by encoding. Accordingly, the total length is 270. After interleaving, the data that is not the redundant data is divided (segmented) in order to distribute the data to transmission channels, and the data length becomes 45. When the data and the redundant data are punctured, the data length becomes 30, the length of each of the redundant data 1 and 2 becomes 60, and the length of the data to be transmitted to a single transmission channel becomes 90. When the puncturing is not performed, the length of the data to be transmitted to a single transmission channel is 135 (data length 45 and the redundant data length 90 are added), and therefore it should be clear that the data volume to be transmitted is significantly reduced.

FIG. 15 is a diagram explaining a data processing flow of the third embodiment.

Information data A, which is transmission data, is encoded, and different redundant data X0 and X1 are generated. Data B is generated by performing the first interleaving only on data A. Next, in order to sort the data to two transmission channels, data B is divided into data B1 and data B2, and the redundant data X0 and X1 are added to data B1 and B2 respectively. Afterward, the second interleave is performed only on the original data, and the data is sent out to the transmission channel. At the receiving end, data B1 and B2 are processed by the second de-interleave processing that corresponds to the second interleave processing, data B1 and B2 are assembled, and the redundant data X0 and X1 are added. An initial de-interleave processing corresponding to the first interleave is performed on B1+B2 and data A is obtained. By decoding data A using the redundant data X0 and X1, the initial information data is obtained.

Figure 16:
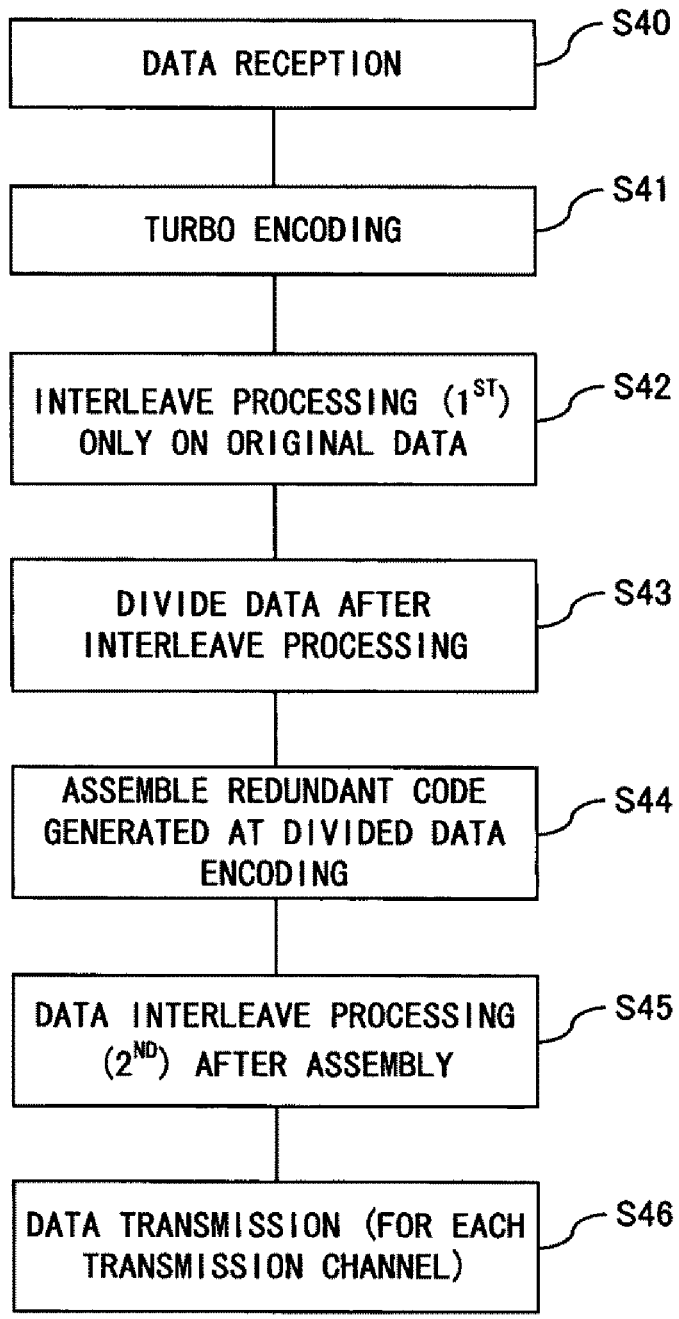
FIG. 16 is a flowchart (1) showing the processing in the DHO unit at the transmitting end and the receiving end of the third embodiment.
Figure 17:
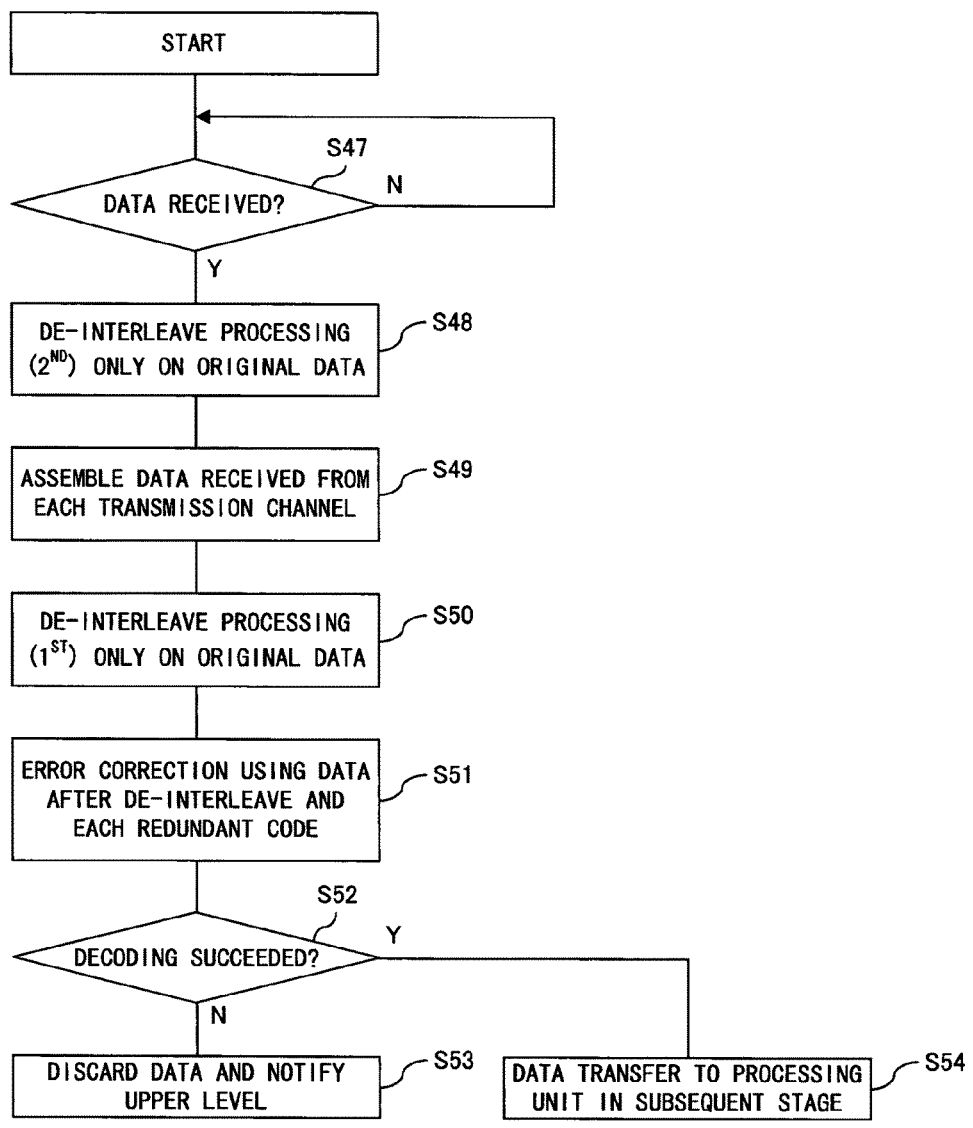
FIG. 17 is a flowchart (2) showing the processing in the DHO unit at the transmitting end and the receiving end of the third embodiment.

FIG. 16 and FIG. 17 are flowcharts showing the processing in the DHO unit at the transmitting end and the receiving end of the third embodiment.

FIG. 16 shows the processing at the transmitting end. When the DHO unit receives data to be transmitted in step S40, turbo encoding is performed on the data in step S41, and the first interleave is performed only on the original data in step S42. In step S43, data is divided after interleave processing; in step S44, the divided data and the redundant data generated at the time of encoding are assembled; and in step S45, the second interleave processing is performed on the assembled data. In step S46, the data is transmitted to each transmission channel.

FIG. 17 shows the processing at the receiving end. Step S47 is a step for waiting for data reception. When the data is received in step S47, the second interleave processing is performed on only the original data in step S48. In step S49, the data received from each transmission channel is assembled; in step S50, the first de-interleave processing is performed on only the original data; and in step S51, error correction is performed by using the data after de-interleave processing and each of the redundant data, and afterward the data is decoded. In step S52, whether or not the decoding has succeeded is determined. When it is determined in step S52 that the decoding has succeeded, the data is transferred to a processing unit in the subsequent stage in step S54. If it is determined in step S52 that the decoding has failed, the data is discarded and upper-level layers are notified in step S53 that the data has been discarded.

Because the DHO of the embodiments of the present invention has a more significant DHO effect than the current DHO (selection-combination method), it is possible to suppress transmission power. As a result, further effective utilization of finite radio capacity can be achieved.

Conventionally, when data in both of the radio transmission channels cannot be decoded due to the degradation of radio quality, it is determined to be a data error; however, the present technique allows re-decoding of the data using the error data to be attempted, and therefore it has a greater error tolerance.

In the second and third embodiments, the data volume to be transmitted can be less than the current volume (because the redundant data for error correction is distributed to a plurality of radio transmission channels), and thus an increase in radio capacity and suppression of the transmission power are expected.

What is claimed is:

1. A mobile communication system for transmitting a radio signal to a mobile station via different radio transmission paths, comprising:
   an error correction encoding unit to perform error correction encoding processing of transmission data;
   a transmission unit to puncture the data processed by the error correction encoding processing with a first puncture pattern, to encode the data processed with the first puncture pattern using a Turbo coding technique and to transmit a radio signal to the mobile station via a first radio transmission path; and
   a transmission unit to puncture the data processed by the error correction encoding processing with a second puncture pattern, to encode the data processed with the second puncture pattern using a Turbo coding technique independently from the data processed by the first puncture pattern and to transmit a radio signal to the mobile station via a second radio transmission path.

2. A mobile station for receiving a radio signal via different radio transmission paths, comprising:
   a reception unit to receive a first radio signal that is error correction encoding data punctured by a first puncture pattern, encoded using a Turbo coding technique and transmitted via a first radio transmission path and a second radio signal that is error correction encoding data punctured by a second puncture pattern, encoded using a Turbo coding technique independently from the data processed by the first puncture pattern and transmitted via a second radio transmission path; and
   a decoding unit to perform error correction decoding processing using data obtained by synthesizing the first radio signal and the second radio signal.

* * * * *